United States Patent [19]

Wain

[11] Patent Number: 5,069,849
[45] Date of Patent: Dec. 3, 1991

[54] METHOD FOR FORMING A MOLDING

[76] Inventor: Peter L. Wain, 16079 Forest, East Detroit, Mich. 48021

[21] Appl. No.: 476,971

[22] Filed: Feb. 7, 1990

[51] Int. Cl.$^5$ .............. B29C 47/08; B29C 45/14; B29C 65/70
[52] U.S. Cl. .................. 264/148; 264/138; 264/152; 264/261; 264/263
[58] Field of Search ............ 264/138, 148, 152, 248, 264/250, 252, 261, 263; 425/123

[56] References Cited

U.S. PATENT DOCUMENTS

| | | | |
|---|---|---|---|
| 2,571,259 | 10/1951 | Kusiak | 264/261 |
| 2,637,073 | 5/1953 | Walther | 264/261 |
| 3,014,611 | 12/1961 | Marshall | 264/261 |
| 4,087,509 | 5/1978 | Gates | 264/295 |
| 4,183,778 | 1/1980 | Mesnel | 264/261 |
| 4,228,912 | 10/1980 | Harris et al. | 264/261 |
| 4,383,812 | 5/1983 | Calcagni | 425/133.1 |
| 4,823,218 | 4/1989 | Ibe et al. | 360/104 |

FOREIGN PATENT DOCUMENTS 2124141  2/1984  United Kingdom .............. 264/263

Primary Examiner—Jan H. Silbaugh
Assistant Examiner—Brian J. Eastley
Attorney, Agent, or Firm—Krass & Young

[57] ABSTRACT

A method for forming a window frame molding for use in association with a motor vehicle window glass. The molding is formed by extruding a plurality of linear members of a suitable plastic material, selectively cutting away a portion of one end of each extrusion, placing the cut away ends in a mold with the ends in juxtaposition within the mold and coacting with the mold to form a corner cavity, and injection molding a similar plastic material into the corner cavity to form a molded corner mold section lockingly interconnecting the extrusions. This process is then repeated at the other corners of the molding to form the final frame molding. The cut away end sections of the extrusions are desirably treated prior to being placed in the mold with a suitable preparation intended to soften the plastic material of the extrusions to facilitate the bonding process as between the extrusions and the injection molded corner insert.

2 Claims, 7 Drawing Sheets

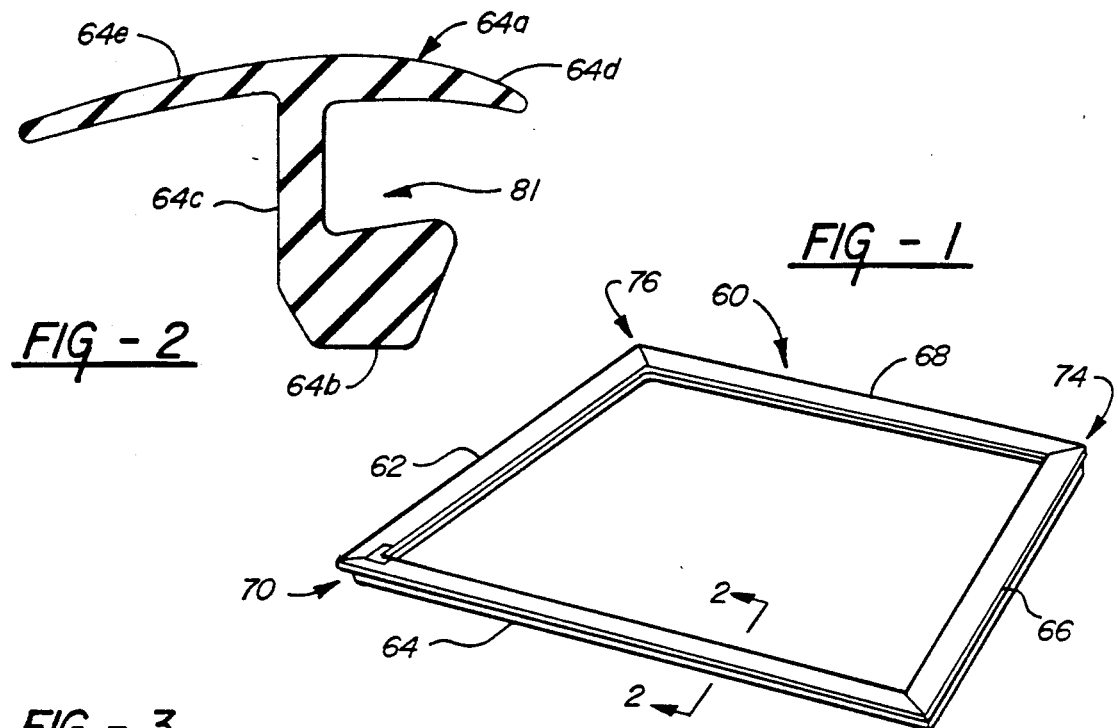
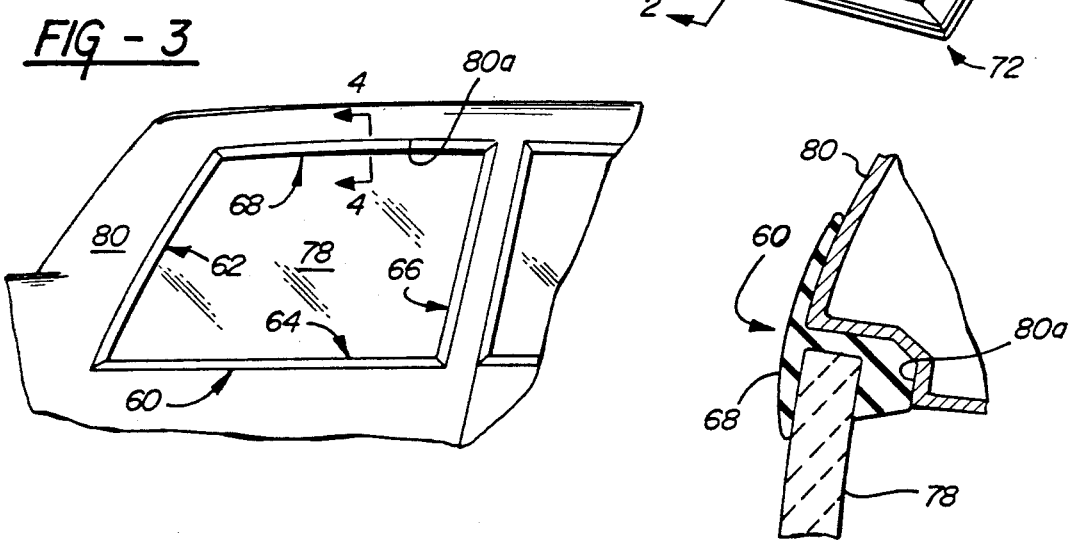
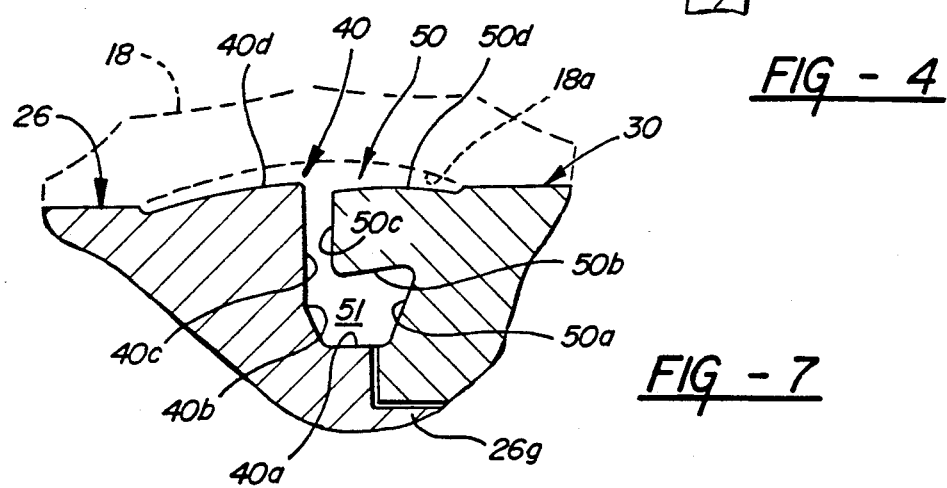

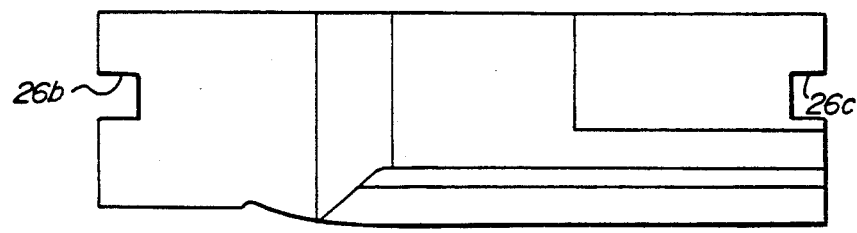
FIG-15
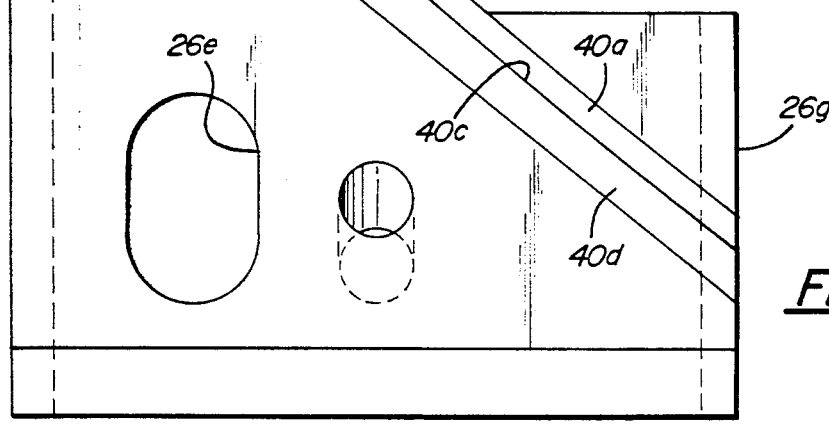
FIG-14
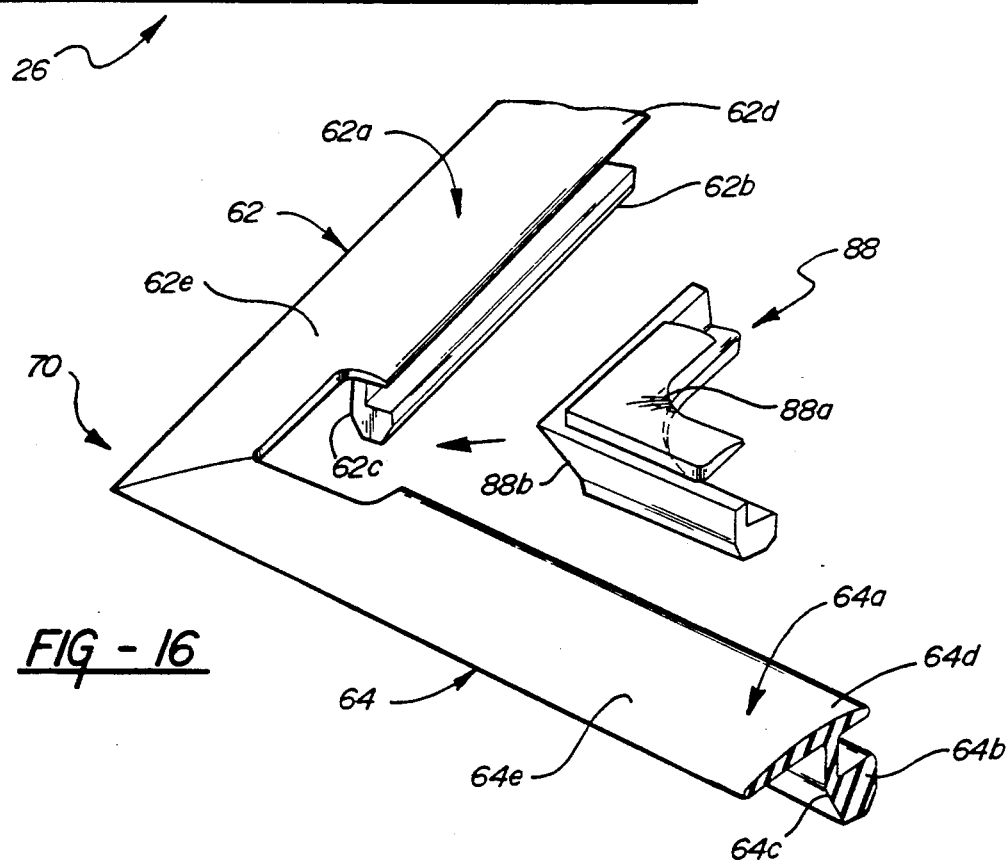
FIG-16

METHOD FOR FORMING A MOLDING

FIELD OF THE INVENTION

This invention relates to plastic moldings and more particularly to a plastic molding in the form of a frame for encircling a window glass of a motor vehicle so as to facilitate the mounting of the window glass in the motor vehicle body structure.

BACKGROUND OF THE INVENTION

Window glass frame moldings in the past have been formed in a single molding operation in which the frame is formed in a large mold defining the entire profile of the frame molding including the linear portions and the corner portions. Whereas this prior art methodology has been generally satisfactory, it requires an extremely large and expensive mold, with the size and expense of the mold increasing with the size of the window glass to be framed, and it is difficult to provide a smooth aesthetically pleasing finish on the frame, especially in the corner sections.

SUMMARY OF THE INVENTION

This invention is directed to the provision of an improved method and apparatus for forming a molding.

More specifically, this invention is directed to the provision of an improved method and apparatus for forming window frame molding for use in association with motor vehicle window glass.

According to the invention methodology, a plastic material is extruded to form linear plastic molding members which, when arranged in end to end relation, form a window frame having a plurality of corners; and plastic material is molded into each corner to form a plurality of molded corner structures binding the linear members together to form the window frame. This methodology, by forming the large area linear portions of the molding in an extrusion process, allows the use of relatively simple and inexpensive molding equipment to form the corner portions of the window frame and allows careful quality control with respect to the finish of the corner portions of the window frame.

According to a further feature of the invention methodology, each corner structure is formed by placing first and second linear members in a mold in an angular disposition relative to each other to form a corner, with one end of the first member juxtaposed within the mold to one end of the second member, and injecting a plastic material into the mold at the juxtaposition of the ends of the first and second linear members to form the corner structure. This arrangement allows known and reliable injection molding techniques to be used in combination with known and reliable extrusion techniques to readily and inexpensively form the window frame while providing excellent quality control with respect to the finish of the frame.

According to a further feature of the invention methodology, a bevel is formed on the ends of the juxtaposed linear members prior to the molding operation. This methodology allows the beveled ends of the linear extrusions to be arranged in a mitered relationship within the mold to facilitate the formation of the corner structure.

According to a further feature of the invention methodology, the linear members of the frame molding have a complex cross-sectional configuration including first and second flange portions and a web portion interconnecting the flange portions and coacting with the flange portions to define a channel for receipt of the window glass and the invention methodology includes the further step of removing the web portion and one of the flange portions of each linear member proximate the corner structure prior to the injection molding step. This methodology allows the injected plastic section to firmly interlock with the juxtaposed ends of the linear extrusion members to facilitate the formation of the corner structure.

According to a further feature of the invention methodology, a portion of the other flange of each linear member proximate the corner structure is removed prior to the injecting step. This methodology further facilitates the interlocking action as between the injected corner structure and the extrusions to further strengthen the mold structure at the corners of the molding.

The invention molding apparatus includes means defining a first elongated mold cavity extending from an outer face of the mold to an internal location within the mold for receipt of a first linear molding member having a cross section corresponding to the cross section of the elongated cavity so that the first linear molding member substantially fills the first elongated mold cavity with an end of the molding member disposed proximate the internal location within the mold; means defining a second elongated mold cavity extending from the outer face of the mold to the internal location for receipt of a second linear molding member having a cross section corresponding to the cross section of the second elongated cavity so that the second linear molding member substantially fills the second elongated mold cavity with an end of the molding member disposed proximate the internal location within the mold; means coacting with the juxtaposed ends of the first and second linear molding members to define a corner mold cavity proximate the internal location in the mold; and gate means extending from a location exteriorally of the mold to the corner mold cavity With this apparatus, the extruded linear molding members may be inserted into the mold with their juxtaposed inner ends coacting with the mold to form a corner mold cavity, whereafter plastic may be injected into the corner mold cavity through the gate means to form the corner structure binding the extrusions together.

According to a further feature of the invention molding apparatus, the mold includes a plurality of bottom mold members mounted for movement relative to each other between a contracted position, in which they coact to at least partially define the first and second elongated mold cavities and the corner mold cavity, and an expanded position to allow loading and unloading of the mold. This arrangement facilitates the loading, molding, and unloading of the invention molding in a manner to readily and efficiently carry out the invention methodology.

According to a further feature of the invention apparatus, the bottom mold members are mounted for generally horizontal relative movement, and the mold further includes a top mold member mounted for generally vertical movement relative to the bottom mold members and coacting with the bottom mold members to define the first and second elongated mold cavities and the corner cavity. This arrangement further facilitates the loading, molding and unloading of the molding.

According to a further feature of the invention, the bottom mold members include first and second side block members movable toward and away from each other between contracted and expanded positions and defining a generally triangular opening therebetween when in their contracted positions and the bottom mold further includes a center block having a triangular portion positioned within the triangular opening defined by the side block members. This arrangement facilitates the receipt of the extrusion within the mold to form the corner cavity.

According to a further feature of the invention, the triangular portion includes an apex positioned at the internal mold location and the corner cavity is defined proximate the apex and the confronting surfaces of the first and second side block members. This specific geometric arrangement as between the several bottom mold members facilitates the insertion of the extrusions into the mold and facilitates the formation of the corner structure at the juxtaposition of the ends of the extrusions within the mold.

BRIEF DESCRIPTION OF THE DRAWING

FIG. 1 is a view of a window frame molding constructed in accordance with the invention method and apparatus;

FIG. 2 is a cross-sectional view taken on line 2—2 of FIG. 1;

FIG. 3 illustrates the molding of FIG. 1 installed in a window opening of a motor vehicle in association with a window glass;

FIG. 4 is a cross-sectional view taken on line 4—4 of FIG. 3;

FIGS. 6 and 7 are cross-sectional views taken on lines 6—6 and 7—7 respectively of FIG. 5;

FIG. 14 is a plan view of another side block employed in the invention mold apparatus;

FIG. 15 is an end view of the side block of FIG. 14;

FIG. 16 is a fragmentary exploded view showing the interrelationship of the extruded sections with the molded corner section of the frame molding.

DETAILED DESCRIPTION OF THE PREFERRED EMBODIMENT

Figure 5:
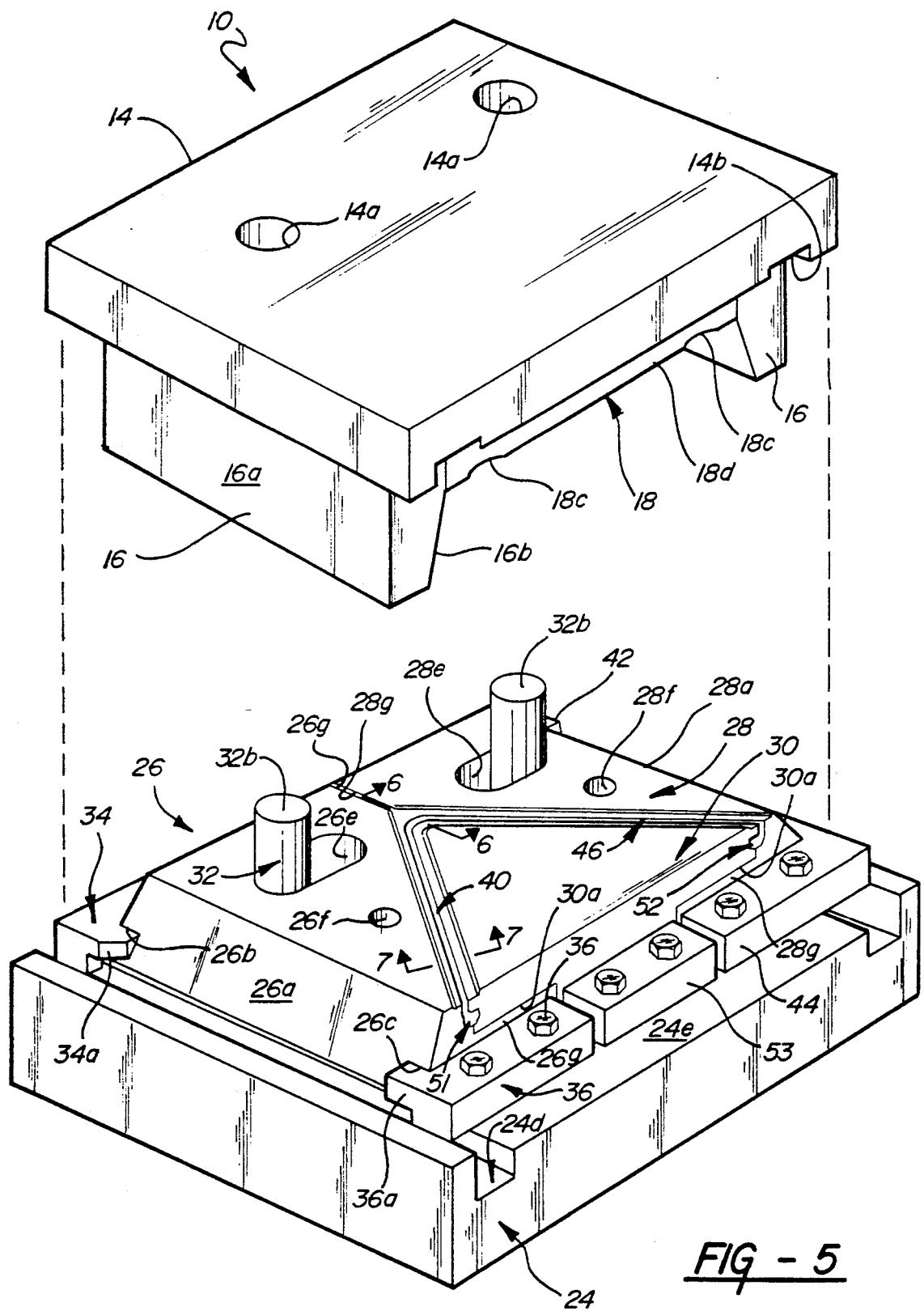
FIG. 5 is an exploded view of the invention mold apparatus.
Figure 10:
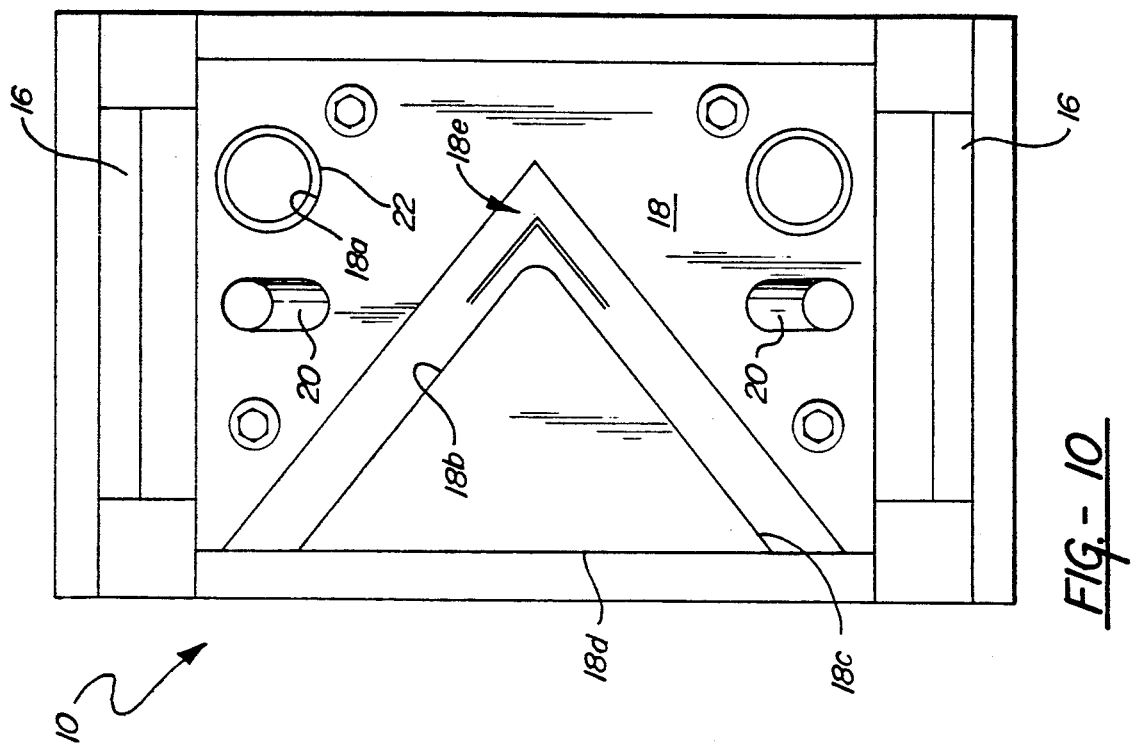
FIG. 10 is a bottom view of the top mold structure of the invention mold apparatus.

The invention mold apparatus, broadly considered, includes an upper mold structure 10 and a lower mold structure 12.

Upper mold structure 10 includes a top plate 14, a pair of heel plates 16, a cavity top block 18, and a pair of horn pins 20.

Top plate 14 is rectangular and includes a pair of through bores 14a and a downwardly opening groove 14b proximate each end edge of the plate.

Heel plates 16 are respectively received at their upper edges in grooves 14b and project downwardly from top plate 14. Each heel plate 16 includes an outboard face 16a normal to the plane of top plate 14 and an inboard wedge face 16b which is oblique with respect to the plane of top plate 14 and extends downwardly and outwardly.

Cavity top block 18 is positioned between heel plates 16 in underlying relation to top plate 14. Through bores 18a are provided in block 18 in respective alignment with through bores 14a in top plate 14 and a bushing 22 is provided in each through bore 18a. The underface of top block 18 defines a downwardly opening V-shaped cavity 18b opening at 18c in the side face 18d of top block 18 and joining to form an apex or corner 18e.

Horn pins 20 are carried by top block 18 and diverge downwardly and outwardly therefrom at oblique angles paralleling the respective heel plate wedge faces 16b.

Lower mold 12 includes a bottom plate 24, cavity side blocks 26 and 28, a cavity center block 30, and a pair of leader pins 32.

Bottom plate 24 is generally rectangular and includes a pair of bores 24a respectively aligned with the bores 14a and 18a and each including a counterbore portion 24b; a pair of blind bores 24c for respective receipt of the lower ends of horn pins 20; and an upwardly opening groove 24d proximate each end edge of the plate for respective receipt of the lower ends of heel plates 16. It should be understood that, in use, bottom plate 24 is suitably secured to a suitable foundation or frame member so as to provide a firm mounting for the mold apparatus.

Cavity side block 26 has a generally triangular configuration and includes a beveled or wedge face 26a along its outboard end edge, defining an angle corresponding to the angle of wedge faces 16b and horn pins 20, and further includes guide grooves 26b and 26c extending along its opposite side edges A guide block 34 is secured to the upper face 24a of bottom plate 24 proximate one side edge of cavity side block 26 and a guide block 36 is secured to the upper face of bottom plate 24 proximate the other side edge of cavity side block 36. Side block 34 includes a tongue portion 34a slidably received in groove 26c and guide block 36 includes a tongue portion 36a slidably received in guide groove 26b. Tongue portions 34a,36a will be seen to mount cavity side block 26 for sliding movement along the top face of bottom plate 24 with the actual frictional engagement occurring between the bottom face 26d of the side block and the upper face of a wear plate 38 secured to the top face of the bottom plate and interposed between the bottom plate and the side blocks 26 and 28.

Side block 26 includes an oblong opening 26e and further includes an oblique through bore 26f sized to receive a horn pin 20 and having an angle corresponding to the angle of horn pins 20, wedge faces 16b, and wedge faces 26a. Side block 26 further includes an obliquely extending molding surface 40 including a bottom surface 40a, a beveled surface 40b, a vertical surface 40c, and a curvilinear surface 40d in the upper face of the side block.

Side block 28 is formed as a mirror image of side block 26 and includes a beveled wedge face 28a, grooves 28b and 28c respectively receiving the tongue portions of guide blocks 42 and 44, a lower face 28*d* slidably guiding on wear plate 38, an oblong opening 28*e*, an oblique through bore 28*f* and an oblique molding surface 46 including a horizontal surface 46*a*, a beveled surface 46*b*, a vertical surface 46*c*, and a curvilinear surface 46*d* in the upper face of the side block.

Cavity center block 30 is triangular and includes grooves or cut outs 30*a* at two of its corners to slidably receive a tongue or pilot portion 26*g*,28*g* of the respective side block. The base 30*b* of triangular center block 30 is flat and the other two sides of the triangular center block define a molding surface 50 for respective coaction with molding surfaces 40 and 46 of side blocks 26 and 28 to respectively define first and second elongate mold cavities 51 and 52.

Molding surface 50 includes a beveled portion 50*a*, a generally horizontal portion 50*b*, a generally vertical portion 50*c*, and a curvilinear portion 50*d* in the upper face of the center block. Center block 30 is constrained along base edge 30*b* by a support block 53 secured to the upper face of face plate 24 and is secured to the upper face of wear plate 38 by bolts 54 which are arranged relative to the center block to allow a limited amount of vertical movement of the center block upwardly away from the upper face of wear plate 38 under the bias of suitable spring means (not shown).

Leader pins 32 have head portions 32*a* seated in base plate counterbores 24*b* and each extends upwardly through a base plate bore 24*a*, through an oblong opening 26*e*, 28*e*, and through a bushing 22 to dispose the upper pin end 32*b* in a top plate bore 14*a*.

The window frame molding formed in accordance with the invention method and apparatus is seen at 60 in FIG. 1.

Frame molding 60 may comprise, for example, a four-sided polygon including sides 62,64,66,68 forming corners 70,72,74,76. Frame molding 60 is intended to be fitted around the peripheral edges of a motor vehicle window glass 78 so as to facilitate the mounting of the window glass fixedly in a suitable opening 80*a* defined in a motor vehicle body 80.

According to the invention, the four sides 62,64,66,68 of the window frame are formed from a suitable plastic material, such as a PVC plastic, in a suitable extrusion operation and the four linear extrusions 62,64,66,68 are thereafter joined together in an injection molding process to form corner structures 70,72,74,76 binding the four linear extrusions together to form the final molding.

Mold apparatus 10 is used to form the several corner moldings. It will be understood that a single mold apparatus 10 may be used to successively form the corner moldings 70,72,74,76 or a plurality of mold apparatus 10 may be used to simultaneously form the several corner structures. The formation of the corner structure 70 will be described in detail, and it will be understood that the formation of the corner structures 72,74,76 is carried out in a similar manner, either simultaneously with the formation of corner structure 70 or sequentially thereafter.

To form the corner structure 70, a pair of linear extrusions 62 and 64 are formed in a suitable extrusion operation from a PVC plastic material. Extrusion 64 has a complex cross-sectional configuration corresponding to the cross sectional configuration of elongated mold cavity 51 and including a base flange portion 64*a*, a channel flange portion 64*b*, and a web portion 64*c* interconnecting channel portions 64*a* and 64*b* and coacting with the inner portion 64*d* of base flange 64*a* to form a channel 81 for receipt of the edge of window glass 78. Web portion 64*c* will be seen to extend from base flange 64*a* at an intermediate location on the base flange proximate the juncture of the inner portion 64*d* of the base flange and the outer portion 64*e* of the base flange. Extrusion 62 has a cross section identical to the cross section of extrusion 64.

Figure 17:
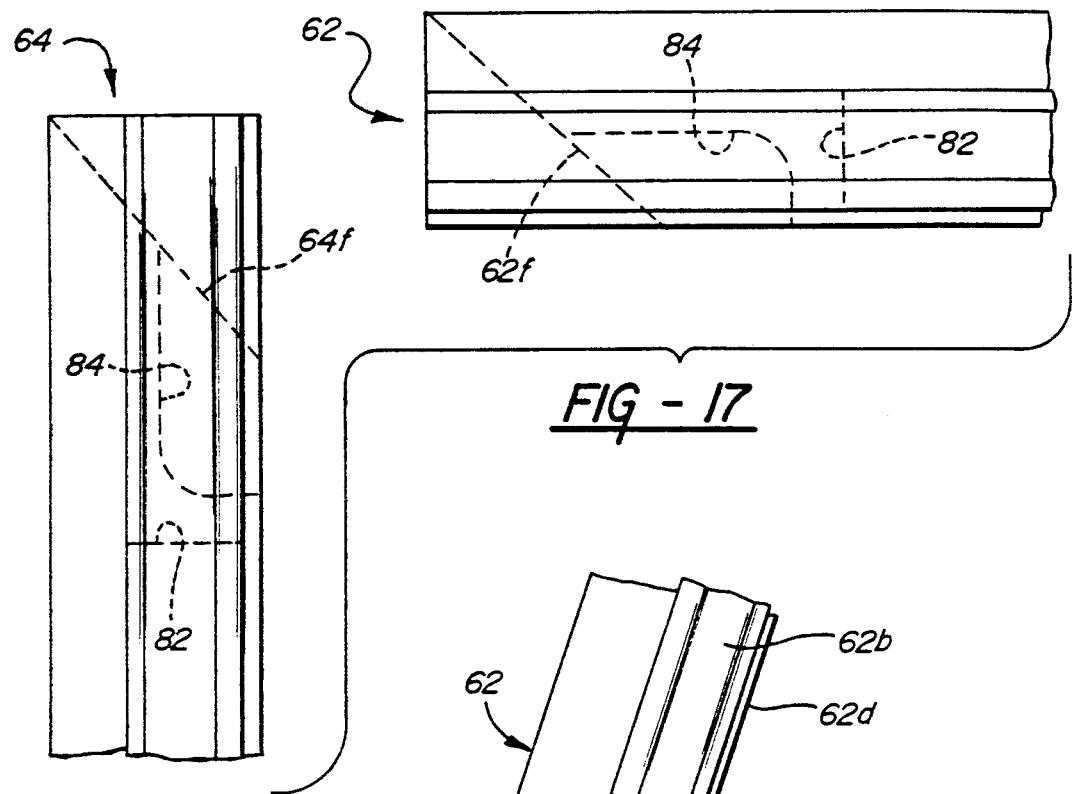
FIGS. 17-19 are fragmentary views illustrating steps in the invention methodology.
Figure 18:
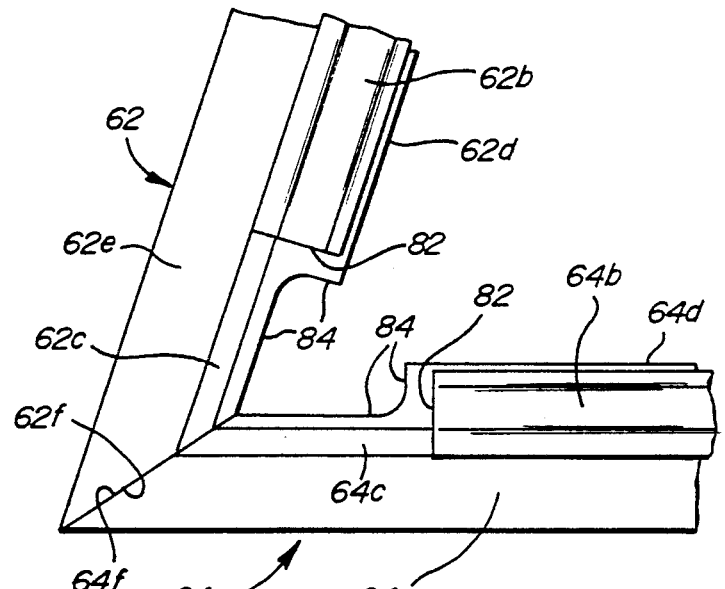
Figure 19:
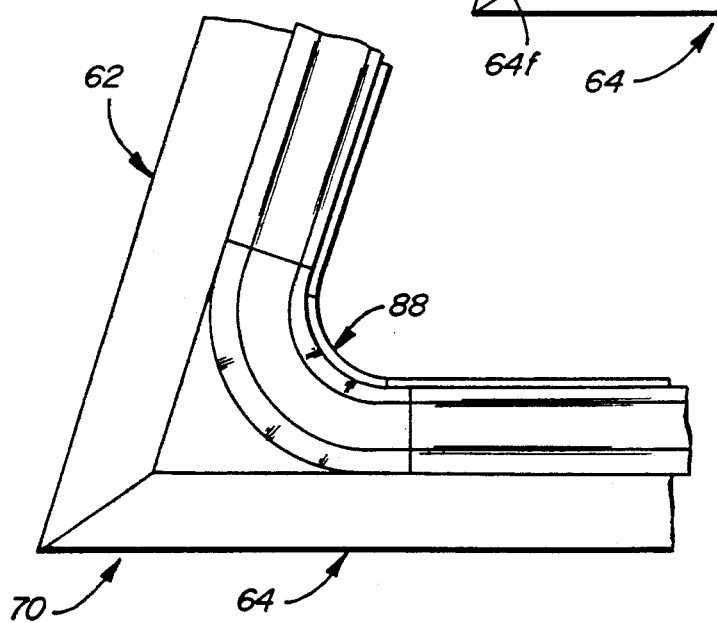

Following the extrusion of the linear members 62 and 64, and as best seen in FIGS. 17-19, one end of each extrusion is cut on a 45 degree bias as seen at 64*f*,62*f*, the web portion 64*c* and channel flange portion 64*b* of extrusion 64, and the web portion 62*c* and channel flange portion 62*b* of extrusion 62, are cut away at 82 to leave a residual low profile portion 64*c*,62*c* of the respective web; and the base flange inner portion 64*d*,62*d* is cut away along line 84 to form the extrusion end configurations best seen in FIG. 18. As seen, cuts 82 are preferably made at a location more remote from the respective ends of the extrusion than the cuts 84 so that more of the web 62*c*,64*c* and channel flange 64 is cut away in each case than is cut away from the inner portion 62*d*,64*d* of the base flange.

Extrusions 62 and 64 are now placed in mold apparatus 10 with upper mold structure 10 raised with respect to lower mold structure 12 to move the side blocks 26 and 28 outwardly under the camming action of horn pins 20 and apertures 26*f*,28*f* so as to provide access to the elongated mold cavities 51 and 52 defined between the confronting molding faces of side blocks 26 and 28 and center block 30. Specifically, extrusion 64 is placed in mold cavity 51 with channel flange 64*b* positioned against mold surface 50*a*,50*b*, web portion 64*c* positioned against mold surface 50*c*, and inner base flange portion 64*d* positioned against mold surface 50*d*, and extrusion 62 is placed in mold cavity 52 with the respective portions of extrusion 62 similarly positioned relative to mold surfaces 50*a*-50*d* and with the inner ends of the extrusions juxtaposed within the mold to place the beveled ends 62*f*,64*f* of the extrusions in contact within the mold at the juncture of passages 51 and 52.

Upper mold structure 10 is now lowered relative to lower mold structure 12 to move the side blocks 26 and 28 inwardly into their molding position under the wedging action of the wedge faces 16*b* of heel plate 16 coacting with wedge faces 26*a*,28*a* of the side block and with the inward movement of the side blocks accommodated by movement of leader pins 32 in oblong openings 26*e*,28*e*.

Figure 6:
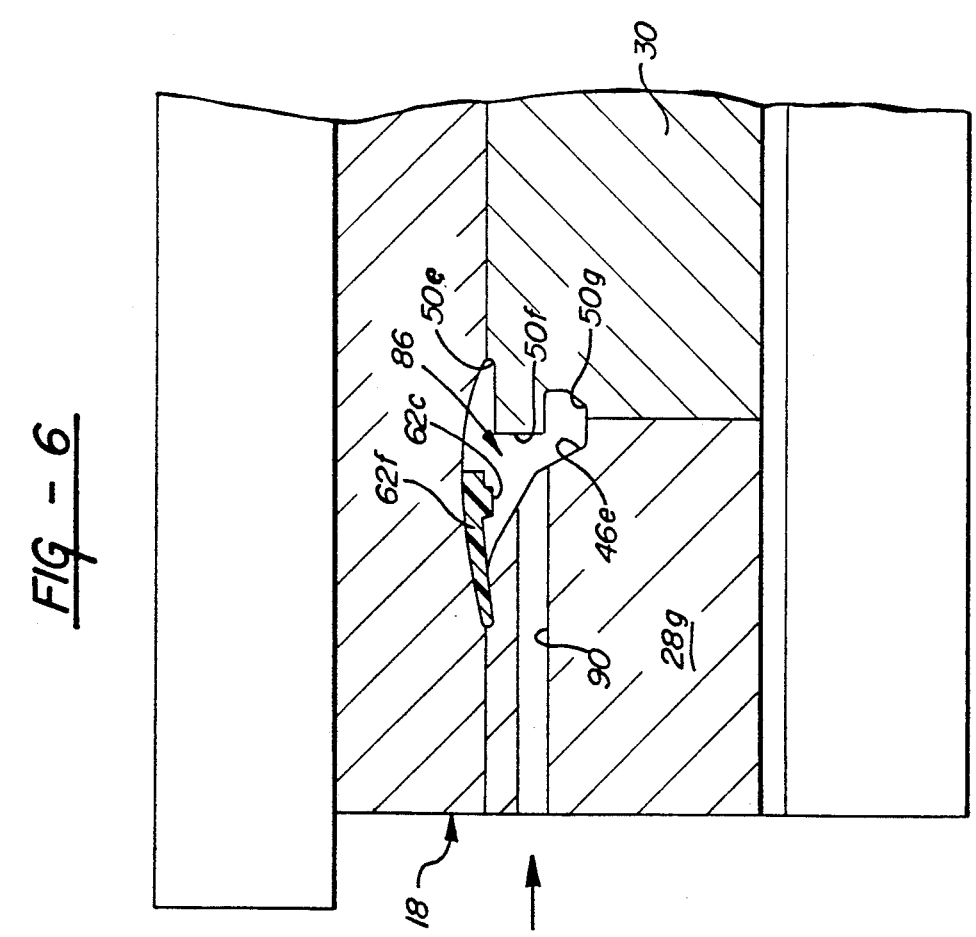
Figure 9:
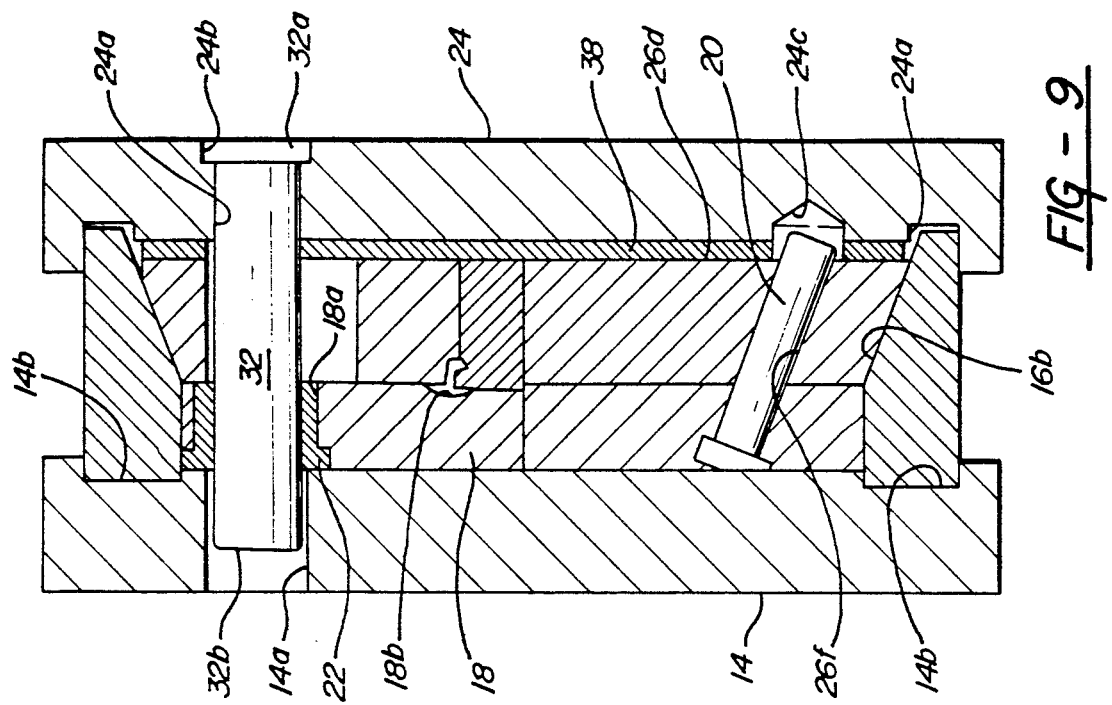
FIG. 9 is a cross-sectional view taken on line 9—9 of FIG. 8 with the top mold structure of the invention mold apparatus in place.
Figure 8:
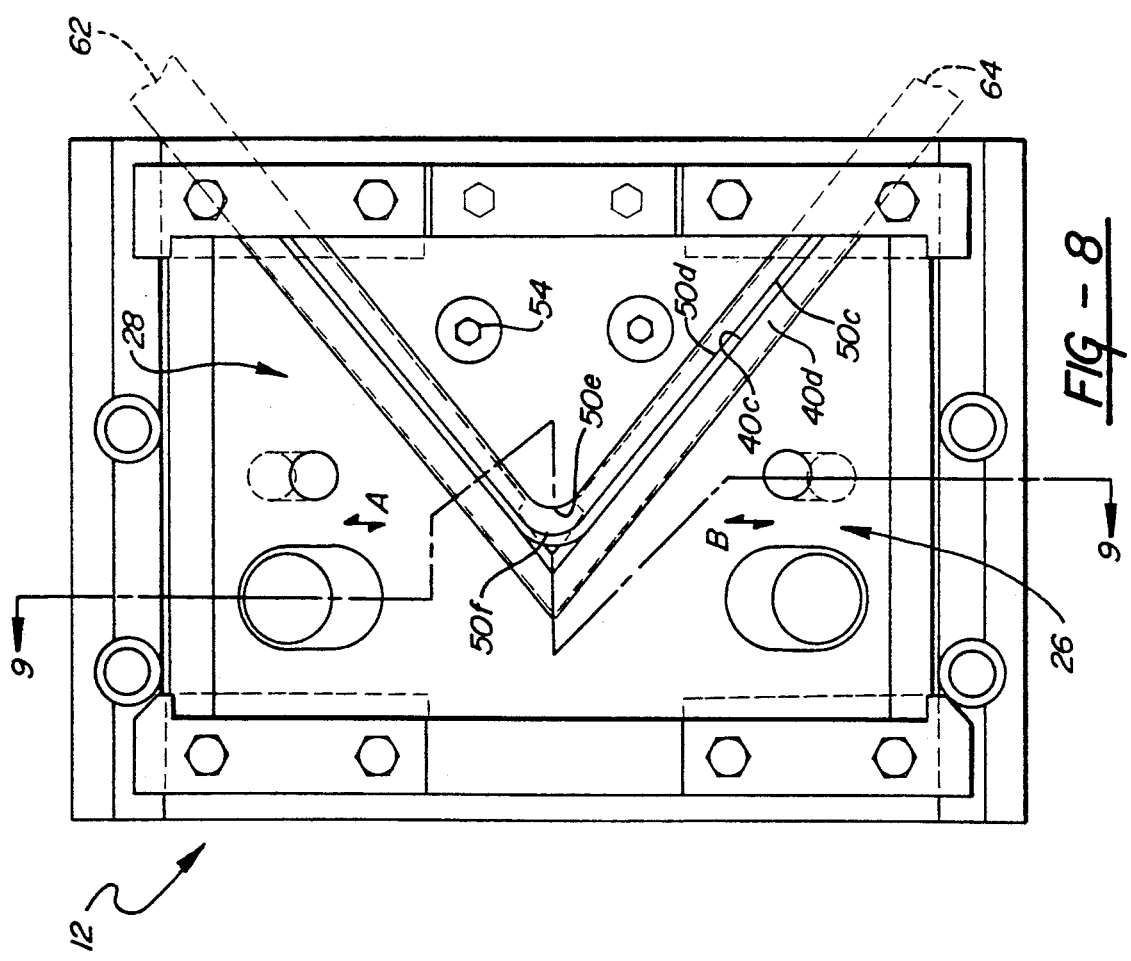
FIG. 8 is a plan view of the bottom mold structure of the invention mold apparatus.
Figure 11:
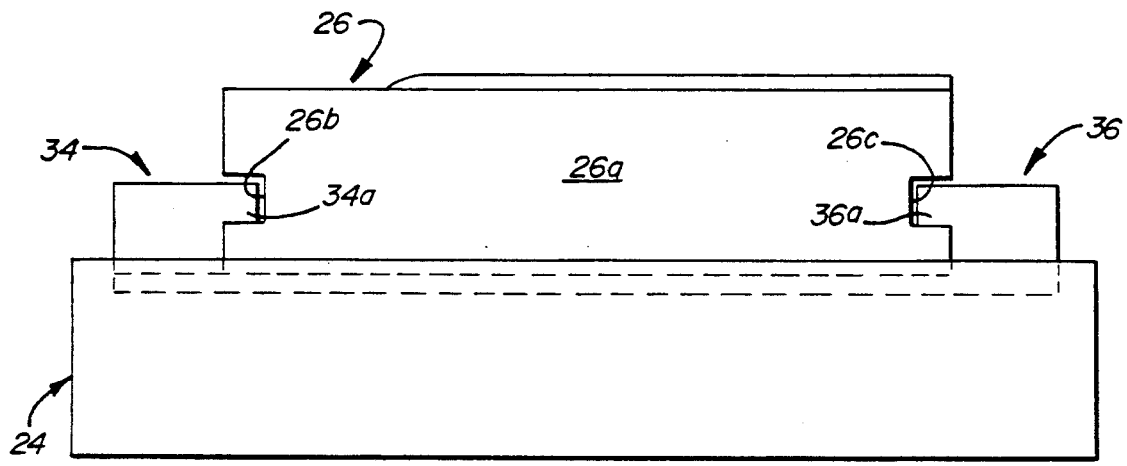
FIG. 11 is an end view of the bottom mold structure of the invention mold apparatus.
Figure 12:
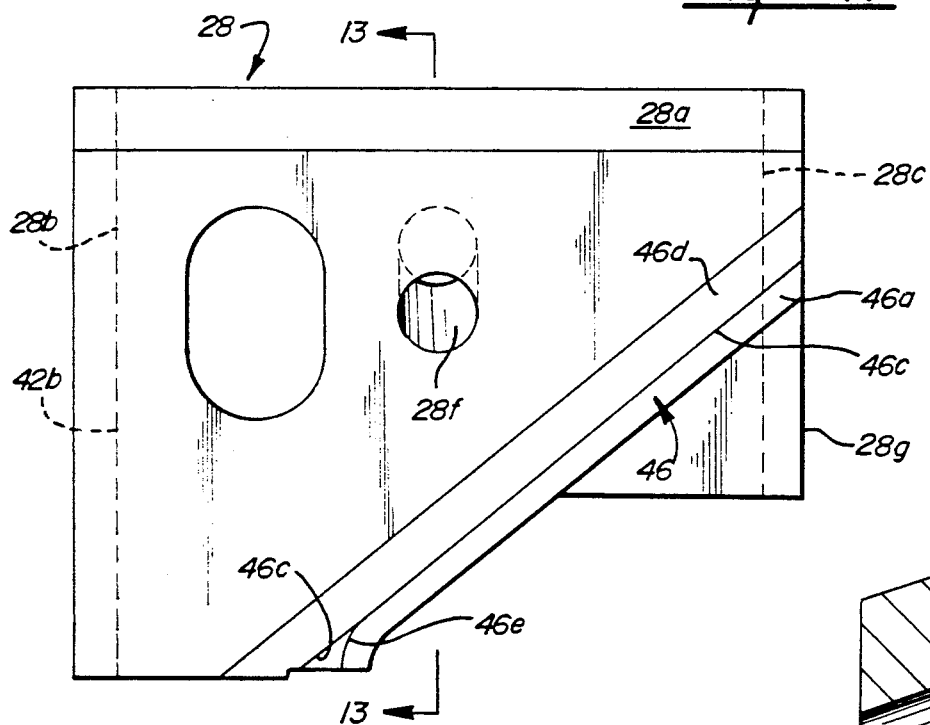
FIG. 12 is a plan view of a side block employed in the invention mold apparatus.
Figure 13:
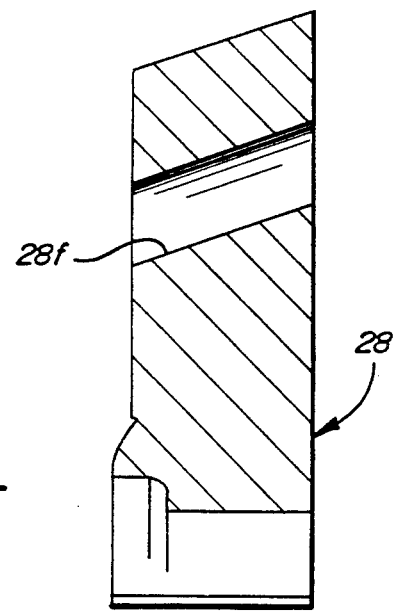
FIG. 13 is a cross-sectional view taken on line 13—13 of FIG. 12.

When the side blocks arrive at their inner molding positions, the side blocks 26,28, center block 30, and cavity top block 18 coact with the juxtaposed ends of the extrusions 62,64 to define a corner mold cavity 86, best seen in FIG. 6 and further illustrated by the molded insert 88 seen in FIG. 16. A gate 90 provided at the interface of confronting side block faces 26*g*,28*g* provides access to the mold cavity 86 from the exterior of the mold.

A plastic material, such for example as a PVC plastic identical to the PVC plastic from which the linear member 62,64 were extruded is now injected in known manner in liquid form through gate 90 to fill cavity 86 and form the corner structure insert 88 interconnecting extrusions 62 and 64. As soon as the molded insert 88 has cured, the mold may be opened by raising upper mold structure 14 relative to lower mold structure 12 to move side blocks 26,28 outwardly away from center block 30 under the action of horn pins 20 coacting with bores 26f,28f with center block 30 also being moved upwardly a slight amount under spring biasing to facilitate the stripping of the joined extrusions 62 and 64 from the mold.

A similar procedure may now be carried out with respect to extrusions 62 and 60 to form corner 76; with respect to extrusions 60 and 66 to form corner 74; and with respect to extrusion 66 and 64 to form corner 72. As previously indicated, the corners may be formed sequentially or simultaneously. Since the four corners of the molding 60 illustrated in the drawings embody slightly different included angles, it would be necessary to utilize four different molds 10 to form the molding 60 with each individual mold respectively configured to provide the respective included angle between the two extrusions to be joined.

Although it is possible to form the corner inserts without any previous preparation of the extrusions beyond that already described, it has been found preferably to treat the cut away areas of the extrusions with a suitable preparation prior to positioning of the extrusions in the mold. The preparation desirably comprises a mixture of a plastic substance corresponding to the plastic material from which the extrusions are formed and from which the corner inserts are molded, in combination with solvents. For example, the preparation may comprise a mixture of PVC plastic and suitable solvents which is brushed onto the cut away areas at the ends of the extrusions prior to placement of the extrusions in the mold. The preparation has the effect of degrading the surfaces adjacent the cut away areas and softening the surfaces to facilitate the bonding process as between the extrusions and the molded insert. The ultimate joinder of the molded insert and the extrusions is believed to comprise a combination of knitting or fusion as between the PVC material of the corner insert and the PVC material of the extrusions and a cementing or gluing action brought about by the preparation that was brushed onto the exposed areas of the extrusions prior to the insert molding operation. A preparation that has been found to be especially effective comprises 20% cyclohexanone, 70% methylethylketone, and 10% raw PVC powder.

Note that the corner insert 88 in effect replaces the cut away inner portions 64d,62d of the base flanges of portions 62c,64c, replaces the cut away extrusion channel flange portions 62b,64b, and, in addition, adds gusseting or reinforcing material to the inner and outer regions of the corner structure and, in effect, moves the original angular disposition of the web and channel flange structures of the individual extrusions 62,64 inwardly with respect to the corner and changes the corner structure to a radiused or rounded structure, as best seen by the insert 88. The rounding is achieved by the rounded or radiused molding surfaces 50e, 50f and 50g formed at the apex of center block 30 and by the rounded or radiused molding surfaces 40e, 46e defined by side blocks 26, 28 at the corner joinder of side blocks 26,28. When comparing the insert 88 to the original corner structure defined by the extrusion 62 and 64, a gusset or inner reinforcement portion 88a has been provided at the inner juncture of the inner flange portions 62d,64d; the composite angular web portion corner structure has been replaced by a rounded web portion flowing smoothly between the cut away sections of the two extrusions; and further gusseting 88b has been added at the outside of the corner outboard of the rounded web portion. The insert 88 thus serves to not only interlock the extrusion 62 and 68 at the corner 70 but also serves to define a smooth, aesthetically pleasing surface finish at the corner 70, including rounded portions to receive the rounded corner portions of the window glass and to strengthen the corner structure.

The invention apparatus and methodology thus provide a molding such as a window frame molding, utilizing relatively inexpensive mold apparatus and yet providing a superior finish as compared to the frame molding achieved utilizing the prior art injection molding process.

Whereas a preferred embodiment of the invention has been illustrated and described in detail, it will be apparent that various changes may be made in the disclosed embodiment without departing from the scope or spirit of the invention.

I claim:

1. A method of forming a plastic edge molding comprising the steps of:
    extruding a plastic material to form first and second linear plastic molding members each having a complex cross-sectional configuration including first and second flange portions and a web portion interconnecting said flange portions and coacting with said flange portions to form a channel;
    removing at least part of one flange portion, the web portion, and at least part of the other flange portion of each molding member proximate one end thereof;
    placing said linear members in a mold in angular disposition relative to each other with said one end of said first member juxtaposed within the mold to said one end of said second member and with the juxtaposed ends and the mold coacting to define a mold cavity between the juxtaposed ends, said mold cavity having a configuration similar to the removed portions; and
    injecting a plastic material into said mold cavity to form a molded corner structure interconnecting said linear members, said molded corner structure replacing the removed portions while adding reinforcing material to regions of the corner structure to provide a rounded portion between the members.

2. A method according to claim 1 wherein only a part of said one flange portion of each molding member is removed, the remaining part of said one flange portion is cut at a bias with respect to the longitudinal axis of the molding member to form a beveled end, and the beveled ends of the molding members are positioned in complemental contiguous relation within the mold.

* * * * *